United States Patent Office 2,766,614
Patented Oct. 16, 1956

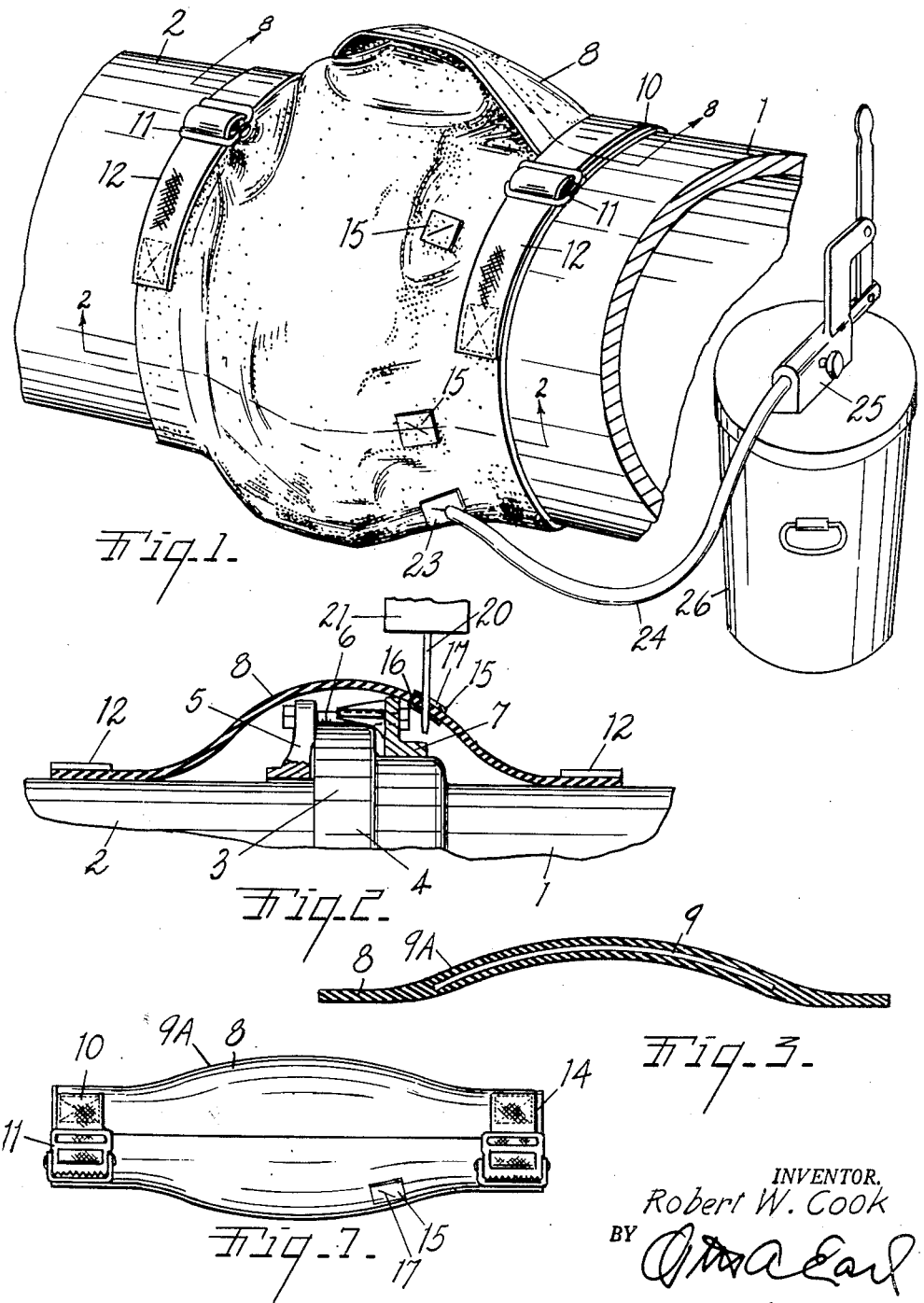

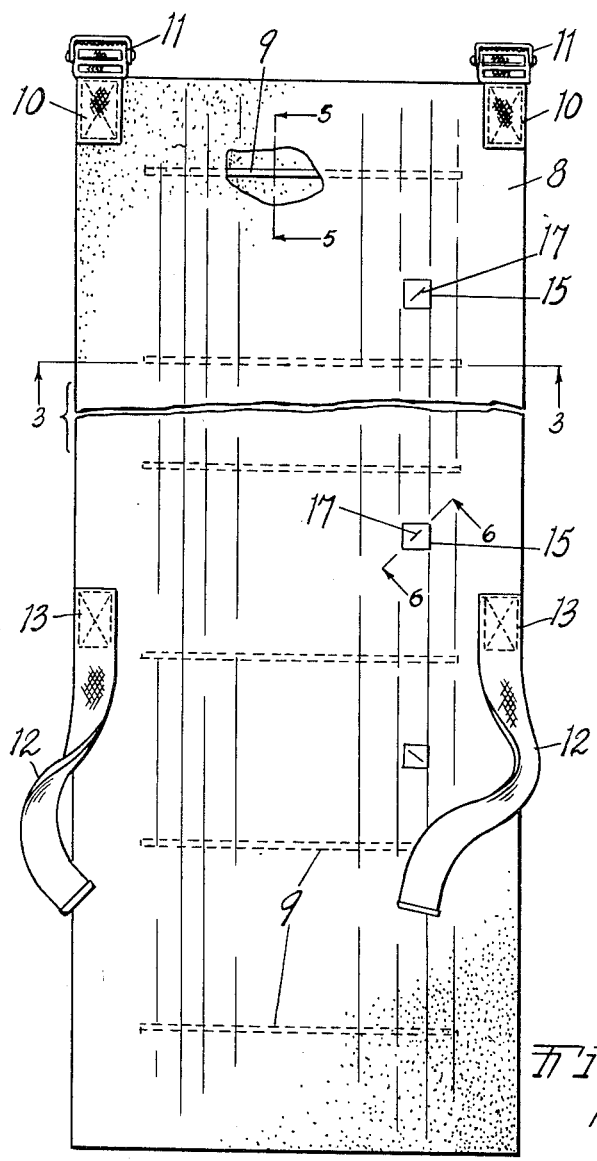
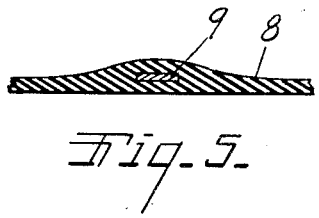
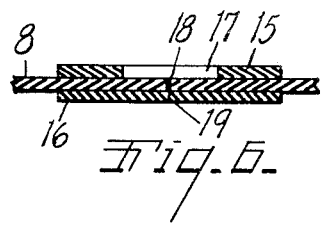
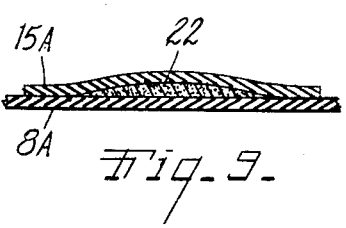
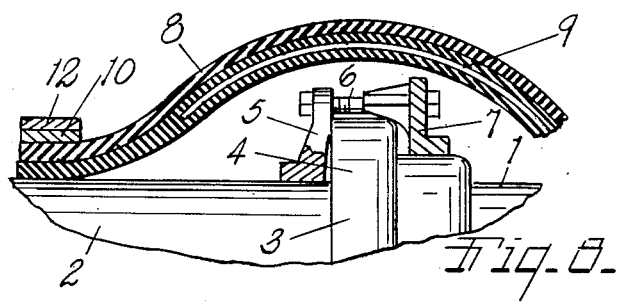

2,766,614

METHOD AND APPARATUS FOR TESTING AND PROTECTING GAS MAIN JOINTS

Robert W. Cook, Kalamazoo, Mich., assignor to Anthony Wayne Improvement Company, Inc., Fort Wayne, Ind.

Application March 9, 1953, Serial No. 341,041

12 Claims. (Cl. 73—46)

This invention relates to improvements in method and apparatus for testing and protecting gas main joints.

The main objects of this invention are:

First, to provide a novel method for testing gas main joints for leaks which method provides a conclusive test for the tightness of the joint and which may be carried out without the use of water or other liquids.

Second, to provide a novel method for testing gas main joints in which the joint is enclosed in a removable blanket of gas impervious material to collect any gas which may escape through the joint and the atmosphere within the blanket is thereafter tested for the presence of any gas.

Third, to provide an apparatus for testing gas main joints for leaks which apparatus is easily applied to and removed from joints of various sizes so that the apparatus may be used indefinitely.

Fourth, to provide an apparatus for testing gas main joints which consists of a flexible blanket that may be wrapped and sealed around a joint to collect gas and which is provided with means for connecting a gas testing instrument to the space within the blanket.

Fifth, to provide an apparatus for testing gas main joints which functions without the use of water or other liquids so that the joints may be tested under dry conditions.

Sixth, to provide a novel flexible blanket adapted to be easily wrapped around a joint in a gas main and releasably sealed to the main to form a gas collecting and protective liquid retaining chamber around the joint.

Seventh, to provide a method of testing and protecting gas main joints by enclosing the joint in a gas impervious wrapper and testing the atmosphere within the wrapper for gas and thereafter filling the wrapper with a protective liquid to submerge the joint and then pumping out excess protective liquid.

Other objects and advantages of the invention will be apparent from a consideration of the following description and claims. The drawings of which there are two sheets illustrating highly practical apparatus and the method for testing gas main joints. One modification of a detail of the apparatus is also illustrated.

Fig. 1 is a perspective view of the apparatus operatively positioned around a joint in a gas main and associated with a source of protective coating material.

Fig. 2 is a fragmentary longitudinal cross sectional view through the gas main and transversely through the enclosing blanket taken along the plane of the line 2—2 in Fig. 1.

Fig. 3 is a transverse cross sectional view through the blanket with the blanket in unrolled position as shown in Fig. 4 and taken along the line 3—3 in Fig. 4.

Fig. 4 is a plan view of the blanket partially broken away.

Fig. 5 is a fragmentary cross sectional view taken along the plane of the line 5—5 in Fig. 4.

Fig. 6 is a fragmentary cross sectional view through the test port in the blanket taken along the plane of the line 6—6 in Fig. 4.

Fig. 7 is an elevational view of the blanket in inoperative rolled condition.

Fig. 8 is a fragmentary transverse cross sectional view through the overlapped portion of the blanket taken along the line 8—8 in Fig. 1.

Fig. 9 is a fragmentary cross sectional view similar to Fig. 6 and illustrating a modified structure for obtaining samples of the atmosphere within the blanket.

Many gas mains are constructed at the present time from preformed sections of pipe having mating coupling portions that are joined together in joints to form a continuous main. The drawings illustrate two sections, 1 and 2, of a common form of pipe joined together in a joint generally indicated at 3 in Fig. 2. The end of the pipe section 1 is provided with a bell 4 within which the end of the pipe section 2 is received. A packing gasket (not visible) is clamped within the bell 4 and around the end of the pipe section 2 to seal the joint. The gasket is clamped in place by a clamp ring 5 and the clamp ring is drawn tight by means of clamp bolts 6 and a coacting backing ring 7. This joint is an example of the type of joint which the present method and apparatus is adapted to test for tightness and protect against corrosion.

The apparatus includes first, an elongated blanket 8 of rubber or other deformable gas impervious material. The blanket is long enough to be wrapped completely around the joint to be tested with a substantial overlapping between the ends of the blanket. Desirably the blanket is moulded with a transverse curvature as indicated at 9A in Figs. 3 and 7 to more easily embrace the projecting clamp rings on the main. Adjacent to the ends where the ends of the blanket will overlap, the blanket is provided with a series of longitudinally spaced transversely extending springable stiffening ribs 9. The ribs may be moulded within the body of a blanket as illustrated or may be secured thereto by other means such as adhesive or retaining patches.

Secured to the corners of one end of the blanket are short attaching straps 10 which connect buckles 11 to the blanket. The buckles 11 project longitudinally from the end of the blanket and are adapted to coact with tightening straps 12 secured to the sides of the blanket as at 13 at points spaced from the opposite end of the blanket. Desirably the end of the blanket which is to be the overlapping end when applied to a gas main is slightly narrower than the other end of the blanket as is indicated at 14 in Fig. 7.

Provision is made for conducting a sample of gas or air through the blanket and the structure for accomplishing this is illustrated in Figs. 2, 4, and 6 and includes external patches 15 secured to the exterior of the blanket and interior patches 16 secured to the opposite side of the blanket. The patches 15 have slits 17 cut therein to extend transversely across other slits 18 formed in the body of the blanket. The underlying patches 16 have similar slits 19 formed therein and registering with the slits 18.

The method of using the foregoing apparatus to test the tightness of a gas main joint consists of the steps of wrapping the blanket around the joint as shown in Figs. 1 and 2 with the narrow end of the blanket and the buckles 11 overlapping the other end of the blanket. The transversely curved shape of the blanket facilitates its bridging the joint and the stiffening ribs 9 press the underlapping end of the blanket into continuous sealing engagement with the overlapping end of the blanket as illustrated in Fig. 9. By engaging the straps 12 with the buckles 11, the side edges of the blanket are drawn into tight sealing engagement with the pipe sections and in so doing the narrowed end of the blanket is stretched transversely to further tighten the seal between the overlapped portions of the blanket.

After the blanket has been sealed around the joint, it is left a sufficient period of time to permit any gas which may be leaking from the joint to accumulate within the blanket. A hollow needle 20 connected to a gas indicating instrument 21 is then pressed through the closed slits 17—18—19 and a sample of the atmosphere within the blanket is drawn out and tested for the presence of gas. After testing the joint the blanket may be removed for use on another joint but the method is not limited to use of reusable rubber blankets as it may be performed with inexpensive non reusable blankets that are left over the joint as a protection after the test has been completed. In working with old joints or on pipes and clamps that have been exposed to gas and may have some residual odor or particles of gas clinging to them it is advisable to make two comparative tests with the instrument 21. The first test is taken immediately upon application of the wrapper to detect residual gas and the second test is taken later to indicate the increase in quantity of gas, if any, which results from a leak.

Fig. 9 illustrates the modified structure for obtaining access to the interior of the blanket. A patch 15A secured to the blanket 8A retains a quantity of self sealing fluid 22 between the patch and the blanket so that the test needle 20 may be inserted at any position through the patch to obtain the gas sample and the punctures caused by the needle will be automatically sealed when the needle is removed.

The blanket 8 also serves as an aid for applying a protective coating to the exterior of the joint and particularly the bolts thereof. To accomplish this a patch 23 is applied to the blanket where it will be positioned near the bottom of the wrapped joint as shown in Fig. 1. The patch 23 and underlying portion of the blanket are slit in the same manner as at the patches 15 to form a self closable opening for a tube 24 that extends to a pump 25 on a container 26 of protective liquid. After the joint has been tested for gas leakage and found to be tight, the protective liquid is pumped into the chamber formed by the blanket to immerse the joint. Flooding the joint with liquid in this manner reaches all surfaces of the joint better than a spraying or painting operation. After the joint is coated the excess liquid can be pumped back into the container. The wrapper can be either removed or left in place on the joint depending on its character as a reusable article or a relatively cheaper non reusable article.

Having thus described my invention, what I claim as new and desire to secure by Letter Patent is:

1. The method for testing joints in gas main for leaks which comprises the steps of wrapping a blanket of gas impervious material around a joint and the adjacent portions of the main with the ends of the blanket in overlapping sealing relation, drawing the side edges of the blanket into tight sealing engagement with the main on each side of the joint, stretching the overlapping end of the blanket transversely of the length of the blanket and longitudinally of the main to draw the overlapping end tight across the underlapped portion of the blanket, permitting the tightened blanket to remain on the joint a sufficient time for leaking gas to accumulate under the blanket, and inserting a hollow needle connected to a gas indicating instrument through a self closing hole in said blanket to sample the atmosphere within the blanket.

2. The method of testing joints in gas mains for leaks which comprises the steps of wrapping a blanket of gas impervious material around a joint and the adjacent portions of the main with the ends of the blanket in overlapping sealing relation, drawing the side edges of the blanket into tight sealing engagement with the main on each side of the joint while simultaneously stretching the overlapping end of the blanket transversely of the length of the blanket and longitudinally of the main to draw the overlapping end tight across the underlapped portion of the blanket, inserting a hollow needle connected to a gas indicating instrument through a self closing hole in said blanket so wrapped and tightened to sample the atmosphere within the blanket and obtain a preliminary indication of gas within the blanket, permitting the tightened blanket to remain on the joint a sufficient time for leaking gas to accumulate under the blanket, and taking a second comparative sample of the atmosphere within said blanket after it has been in place for a period of time.

3. The method of testing joints in gas mains for leaks which comprises the steps of wrapping a blanket of gas impervious material around a joint and the adjacent portions of the main with the ends of the blanket in overlapping sealing relation, drawing the side edges of the blanket into tight sealing engagement with the main on each side of the joint inserting a hollow needle connected to a gas indicating instrument through a hole in said blanket so wrapped and tightened to sample the atmosphere within the blanket and obtain a preliminary indication of gas within the blanket, permitting the tightened blanket to remain on the joint a sufficient time for leaking gas to accumulate under the blanket, and taking a second comparative sample of the atmosphere within said blanket after it has been in place for a period of time.

4. The method of testing joints in gas mains for leaks which comprises the steps of wrapping a blanket of gas impervious material around a joint and the adjacent portions of the main with the ends of the blanket in overlapping sealing relation, drawing the side edges of the blanket into tight sealing engagement with the main on each side of the joint, permitting the tightened blanket to remain on the joint a sufficient time for leaking gas to accumulate under the blanket, and connecting a gas indicating instrument to the interior of the tightened blanket to sample the atmosphere within the blanket.

5. Apparatus for enclosing joints in gas mains to test for leaks comprising an elongated rubber blanket having a molded transversely curved cross section, said blanket being longer than the circumference of the joints to be tested and having one end narrower than the other, transversely extending springable stiffening ribs secured to said blanket at longitudinally spaced positions adjacent each end thereof, longitudinally extending buckles secured to the corners of said blanket at the narrow end thereof, straps secured to the side edges of said blanket at opposite points spaced from the wide end thereof and extending oppositely from said buckles to coact therewith when the blanket is wrapped around a joint, and means forming a self closable opening through said blanket and positioned between said straps and said buckles, said means including a rubber patch secured to said blanket with the patch and underlying portion of the blanket having crossed self closing slits formed therein.

6. Apparatus for enclosing joints in gas mains to test for leaks comprising an elongated rubber blanket, said blanket being longer than the circumference of the joints to be tested and having one end narrower than the other, transversely extending springable stiffening ribs secured to said blanket at longitudinally spaced position adjacent each end thereof, longitudinally extending buckles secured to the corners of said blanket at the narrow end thereof, straps secured to the side edges of said blanket at opposite points spaced from the wide end thereof and extending oppositely from said buckles to coact therewith when the blanket is wrapped around a joint, and means forming a self closable opening through said blanket and positioned between said straps and said buckles.

7. Apparatus for enclosing joints in gas mains to test for leaks comprising an elongated rubber blanket, said blanket being longer than the circumference of the joints to be tested and having one end narrower than the other, transversely extending springable stiffening ribs secured to said blanket at longitudinally spaced positions adjacent the wide one end thereof, coacting longitudinally extending buckles and straps secured to said blanket at one end and at the side edges of said blanket at opposite points spaced from the other end thereof and extending oppositely to coact when the blanket is wrapped around a joint, and means forming a closable opening through said blanket and positioned between said straps and said buckles.

8. Apparatus for enclosing joints in gas mains to test for leaks comprising an elongated rubber blanket, said blanket being longer that the circumference of the joints to be tested, transversely extending springable stiffening ribs secured to said blanket at longitudinally spaced positions adjacent one end thereof, coacting longitudinally extending buckles and straps secured to said blanket at one end and at the side edges of said blanket at opposite points spaced from the other end thereof and extending oppositely to coact when the blanket is wrapped around a joint, and means forming a closable opening through said blanket and positioned between said straps and said buckles.

9. Apparatus for enclosing joints in gas mains to test for leaks comprising an elongated gas impervious blanket having a molded transversely curved cross section, said blanket being longer than the circumference of the joints to be tested, transversely extending springable stiffening ribs secured to said blanket at longitudinally spaced positions adjacent one end thereof, longitudinally extending straps and buckles secured to the side edges of said blanket and extending oppositely to coact in clamping the edges of the blanket to a main when the blanket is wrapped around a joint, and means forming a closable opening through said blanket and spaced from the ends thereof, said means including a lamination secured to said blanket with a quantity of self sealing material between the laminations.

10. Apparatus for enclosing joints in gas mains to test for leaks comprising an elongated gas impervious blanket, said blanket being longer than the circumference of the joints to be tested, transversely extending springable stiffening elements on said blanket at longitudinally spaced position adjacent one end thereof, strap means secured to the side edges of said blanket and adapted to clamp the same to a pipe when the blanket is wrapped around a joint, and means forming a closable opening through said blanket.

11. The method of testing and protecting joints in gas mains which comprises the steps of wrapping a blanket of gas impervious material around a joint and the adjacent portions of the main with the ends of the blanket in overlapping sealing relation at the top of the joint, drawing the side edges of the blanket into tight sealing engagement with the main on each side of the joint, permitting the tightened blanket to remain on the joint a sufficient time for leaking gas to accumulate under the blanket, connecting a gas indicating instrument to the interior of the tightened blanket to sample the atmosphere within the blanket, introducing a quantity of protective liquid into the blanket so tightened through a lower portion of the blanket to immerse the joint, and thereafter pumping excess of said liquid from within said blanket.

12. The method of testing and protecting joints in gas mains which comprises the steps of wrapping a blanket of gas impervious material around a joint and the adjacent portions of the main with the ends of the blanket in overlapping relation at the top of the joint, drawing the side edges of the blanket into tight sealing engagement with the main on each side of the joint, permitting the tightened blanket to remain on the joint a sufficient time for leaking gas to accumulate under the blanket, connecting a gas indicating instrument to the interior of the tightened blanket to sample the atmosphere within the blanket, and introducing a quantity of protective liquid into the blanket so tightened through a lower portion of the blanket to immerse the joint.

References Cited in the file of this patent

UNITED STATES PATENTS

| 317,408 | Moeser | May 5, 1885 |
| 333,011 | Hoeveler | Dec. 22, 1885 |
| 478,424 | Gueguen | July 5, 1892 |
| 1,263,053 | Smyth | Apr. 23, 1918 |
| 2,016,905 | Nathan et al. | Oct. 8, 1935 |
| 2,371,243 | Jordan | Mar. 13, 1945 |
| 2,571,236 | Hamilton | Oct. 16, 1951 |
| 2,573,366 | Scholl | Oct. 30, 1951 |
| 2,601,840 | Smith et al. | July 1, 1952 |

FOREIGN PATENTS

| 383,376 | Germany | Oct. 12, 1923 |